(No Model.) 2 Sheets—Sheet 1.

C. V. ZINN.
BICYCLE BELL.

No. 563,834. Patented July 14, 1896.

WITNESSES:
C. Nordfors
C. Gerst.

INVENTOR
Claude V. Zinn
BY
Edgar Tate &co
ATTORNEYS.

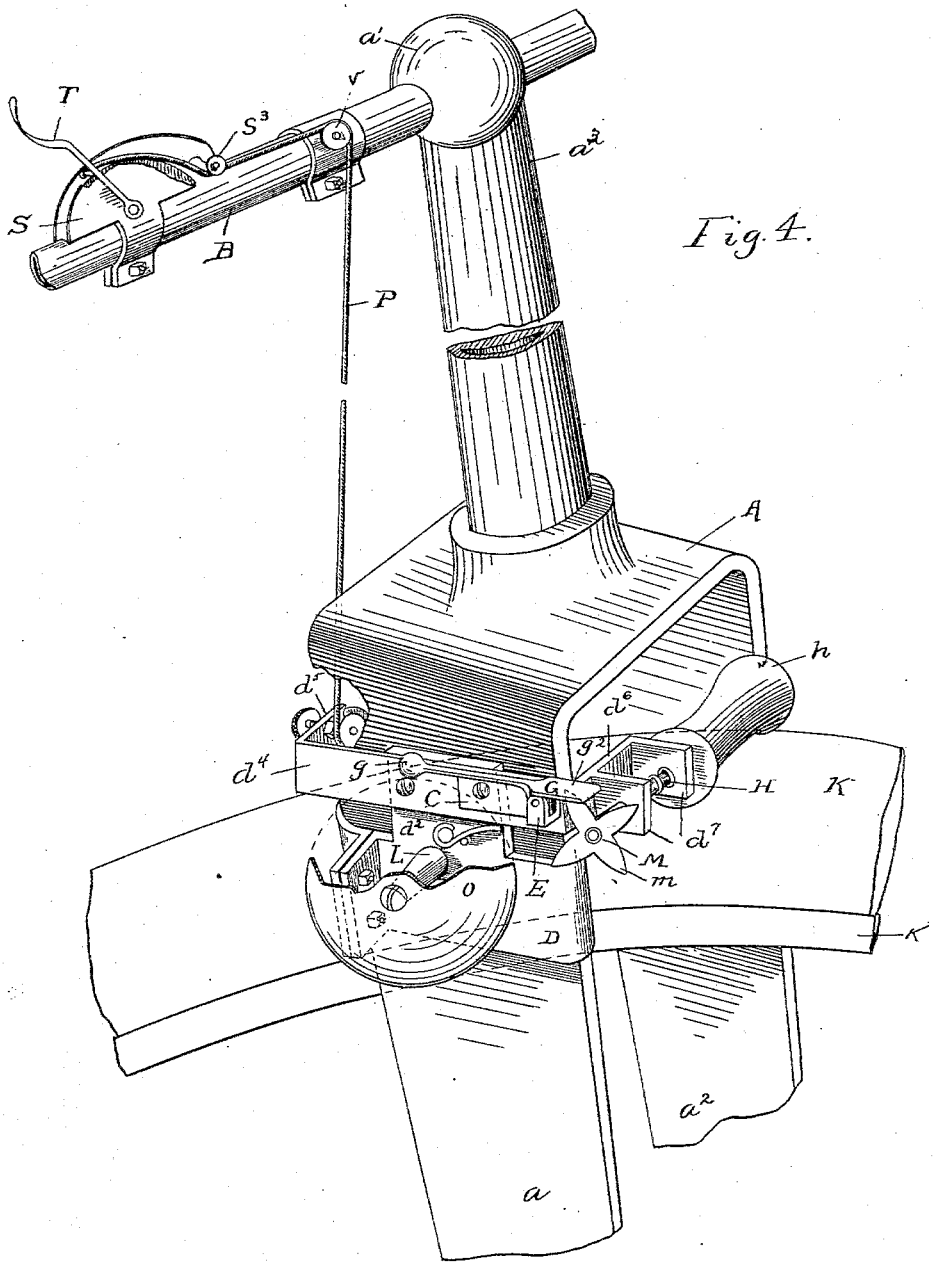

UNITED STATES PATENT OFFICE.

CLAUDE VERNON ZINN, OF OGDEN, UTAH.

BICYCLE-BELL.

SPECIFICATION forming part of Letters Patent No. 563,834, dated July 14, 1896.

Application filed February 5, 1896. Serial No. 578,104. (No model.)

*To all whom it may concern:*

Be it known that I, CLAUDE VERNON ZINN, a citizen of the United States, and a resident of Ogden, in the county of Weber and State of Utah, have invented certain new and useful Improvements in Bicycle-Bells, of which the following is a specification, reference being had to the accompanying drawings, forming a part hereof, in which similar letters of reference indicate corresponding parts.

The object of this invention is to provide alarm-bells for bicycles which will give a continuous alarm after the manner of an electric bell as long as desired, or in accordance with the will of the operator, as long as the bicycle is in motion on which it is fixed; and with this and other objects in view the invention consists in the construction, combination, and arrangement of parts hereinafter described and claimed.

The invention is fully disclosed in the following specification, of which the accompanying drawings form a part, in which—

Figure 1:
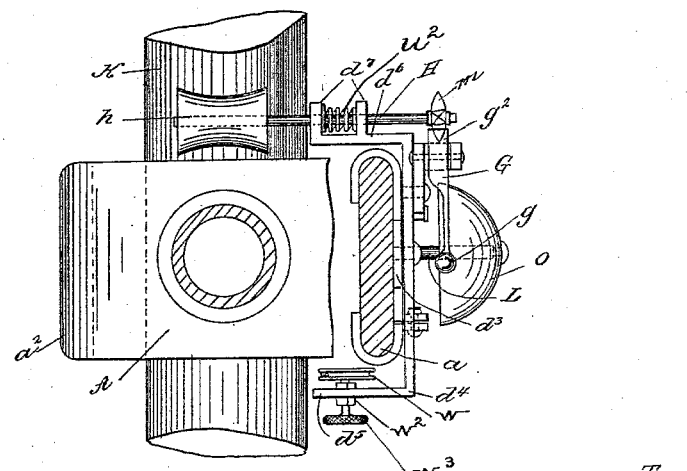
Figures 2, 3:
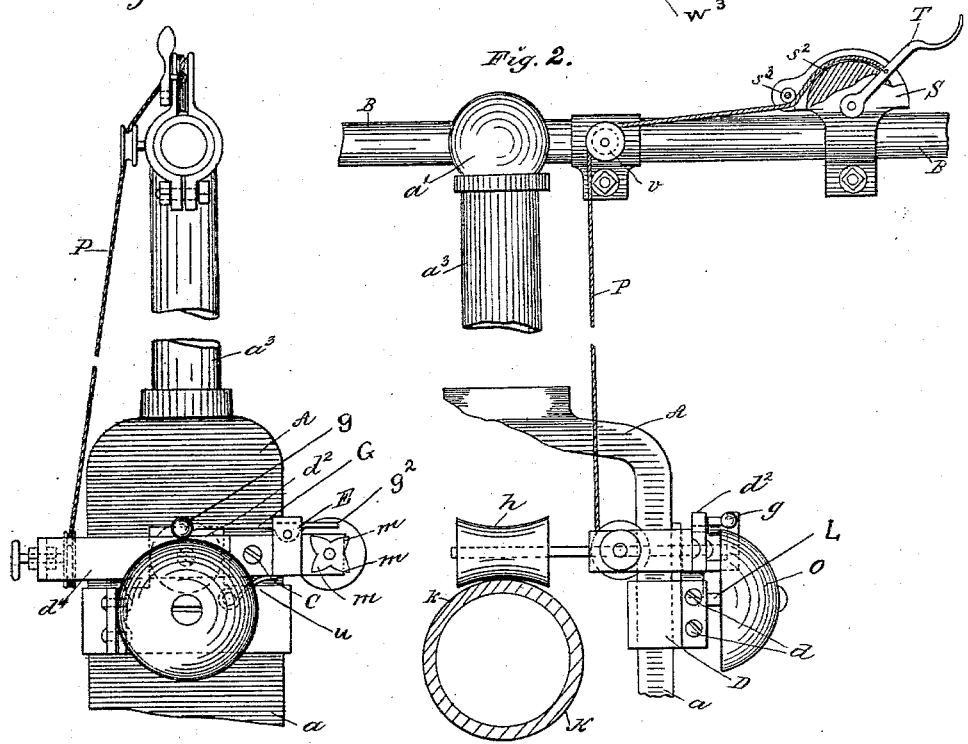

Figure 1 is a plan view of my improvement applied to the fork of a bicycle, a part of the fork and the handle-bar being removed. Fig. 2 is a rear elevation of the upper part of the forward fork of the frame, showing the rear view of my improvement and a section of the drive-wheel. Fig. 3 is a side elevation of the upper portion of the fork, showing the handle-bar in section. Fig. 4 is a perspective view showing the alarm attachment applied upon the fork of a bicycle.

In the drawings forming part of this application, A represents the forward fork of a bicycle or similar vehicle, which is composed of the vertical side pieces $a$ and $a^2$, the lower ends of which, in practice, are connected with the axle of the drive-wheel, (not shown,) and the upper portion thereof is provided, as usual in this class of devices, with an upwardly-directed tubular rod $a^3$, through which passes the shaft $a^4$, with which the handle-bar B is connected.

In the practice of my invention, I secure to one of the sides of the yoke A, and preferably to the side $a$, (shown in the drawings,) a clamp or band D, which is composed of two parts, each of which is provided with a projecting shoulder, by means of which they are connected by means of bolts or screws, as shown at $d$. The band or clamp D is provided with an upwardly-directed lug $d^2$, to which is pivoted at $d^3$ a lever $d^4$, the rear end of which is provided with an inwardly-directed arm $d^5$, and the forward end of which is provided with an inwardly-directed arm $d^6$, on which are formed two forwardly-directed shoulders or projections $d^7$.

Secured to the upper forward portion of the lever $d^4$ is an arm C, which is provided at its forward end with a yoke E, the ends of which are directed upwardly, and pivoted therein is a hammer-lever G, the rear end of which is provided with a head or hammer $g$ and the forward end of which is provided with a plate $g^2$.

Mounted in the shoulders or projections $d^7$ of the arm $d^6$ is a shaft H, on the inner end of which is mounted a roller $h$, which is adapted to bear upon the tire K of the drive-wheel, the rim of which is shown at $k$, and secured to or mounted on the outer end of the shaft H is a sounder M, which consists of a hub mounted on the end of said shaft, on which are formed sprockets or projections $m$, any preferred number of which may be employed, but four of which are provided in the drawings, and these sprockets or projections are adapted to operate in connection with the plate $g^2$ at the end of the lever G.

Secured to the side of the clamp or band D is a tubular bearing or projection L, (shown in Fig. 2,) and in practice I mount thereon a circular gong O, (also shown in said figure,) and connected with the inner end of the arm $d^5$ of the lever $d^4$ is a cord or chain P, which passes upwardly to the handle-bar B and over a pulley $b$, mounted thereon, and outwardly to a segmental attachment S, provided with a peripheral groove $S^2$ and a pulley $S^3$ at the inner end thereof. The cord or chain P passes beneath the pulley $S^3$ and around the segmental attachment S in the groove $S^2$ in the perimeter thereof, and is connected with a lever T, which is pivotally secured to the side of the segmental attachment S. The object of this segmental attachment is to provide a guide or support for the cord or chain, to afford attachment for the lever T, as by drawing said cord over said attachment S the movement of the parts is increased by the similar movement of the cord.

The operation will be readily understood from the foregoing description, when taken in connection with the accompanying drawings. The end of the lever T is adjacent to one of the handles of the handle-bar B, and whenever it is desired to sound an alarm it is only necessary to draw down the free end of said lever, and this operation raises the rear end of the lever $d^4$ and depresses the front end thereof, and this operation depresses the roller $h$ until it rests upon the tire K of the drive-wheel, and said roller and the shaft on which it is mounted is rapidly revolved by the drive-wheel, in which operation the sounder M, or the sprockets or projections formed thereon, are caused to strike in succession the end of the plate $g^2$ of the lever G, and this operation causes the head or arm $g$ at the opposite end of said lever to operate on the gong O, and this operation will be continued as long as the lever T is depressed.

In the normal position of the parts, the forward end of the lever $d^4$ is held in a raised position by a spring U, connected with the clamp or band D, and mounted on the shaft H, between the shoulders or projections $d^7$, is a spring $U^2$, which is designed to prevent the too free movement of the shaft H, and to allow it to revolve only when a certain degree of pressure is applied thereto through the roller $h$.

The handle-bars of all bicycles or similar vehicles are vertically adjustable, and when my improvement is applied thereto it is necessary to provide means for taking up or letting out the cord or chain P, so as to accommodate the same to this vertical adjustment of the handle-bars, and this I accomplish by means of a pulley W, which is mounted on a bolt $W^2$, which passes through the arm $d^5$ of the lever $d^4$, and is provided with a set-screw $W^3$, the cord being passed over said pulley; and it will be understood that when the lever T is released the spring U will raise the forward end of the lever $d^4$ and thus remove the roller $h$ from contact with the tire of the drive-wheel, and the alarm will cease to operate and will not again operate until the lever T is again depressed, and it is also evident that the device herein described may be applied to tricycles and other forms of vehicles; and, Having fully described my invention, I claim as new and desire to secure by Letters Patent—

1. An alarm device for bicycles and similar vehicles, consisting of a two-part clamp having shoulders or lugs, by means of which the clamp is secured upon the fork of the bicycle, said clamp having a central vertical extension and being provided with a tubular projection extending at right angles thereto, a lever pivotally connected with said central extension and having inwardly-directed arms, the forward arm being provided with two outwardly-directed shoulders, a shaft mounted in said shoulders and adapted to be operated by the wheel of the bicycle, a bell or gong secured to said tubular projection and means for forcing said shaft into engagement of the wheel to sound the alarm, substantially as described.

2. An alarm device for bicycles and similar vehicles, consisting of a two-part clamp having shoulders or lugs by means of which the clamp is secured upon a fork of the bicycle, said clamp having a central vertical extension and being provided with a tubular projection extending at right angles thereto, a bell thereon a lever pivotally connected with said central extension and having inwardly-directed arms, the forward arm being provided with two outwardly-directed shoulders, a shaft mounted in said shoulders and carrying a contact wheel or roller adapted to contact with the tire of the wheel, said shaft being provided on its opposite end with a sounder, an arm secured to the forward portion of said lever, and having a yoke formed in the forward end thereof, a hammer-lever pivoted in said yoke portion and provided with a hammer-head adapted to operate upon said bell, the opposite end of said hammer-lever being provided with a plate, adapted to be operated by said sounder, and means for forcing said roller in contact with the tire to sound a bell, substantially as described.

3. An alarm device for bicycles and similar vehicles, consisting of a two-part clamp having shoulders or lugs by means of which the clamp is secured upon a fork of the bicycle, said clamp having a central vertical extension and being provided with a tubular projection extending at right angles thereto, a bell or gong secured to said projection, a lever pivotally connected with said central extension and having inwardly-directed arms, the forward arm being provided with two outwardly-directed shoulders, the other arm having mounted therein a roller or pulley, a shaft mounted in said shoulders or lugs of the forward arm and carrying a contact wheel or roller adapted to contact with the tire of the wheel, said shaft being provided on its opposite end with a sounder, an arm secured to the forward portion of said lever, and having a yoke formed in the forward end thereof, a hammer-lever pivoted in said yoke portion and provided with a hammer-head adapted to operate upon said bell, the opposite end of said hammer-lever being provided with a plate, adapted to be operated by said sounder, a pulley carried by a clamp secured upon the handle-bar, a segmental attachment also secured upon the handle-bar it consisting of a clamp provided with a segmental portion to the lower portion of which is pivoted a lever, said attachment being provided with a peripheral groove, and a pulley at the inner end thereof, and a cord or chain attached to the rear arm of said first-mentioned lever and extending over the pulley mounted on the handle-bar, and a pulley at the inner end of said attachment, and a peripheral groove of the same and secured to said attachment, substantially as herein set forth.

4. An alarm for bicycles and similar vehicles, comprising a clamp which is adapted to be connected with the forward fork of the frame, a gong connected therewith, a lever connected with said clamp, a roller supported at one end of said lever, and adapted to be operated by the drive-wheel, a cord or other device connected with the other end of said lever and extending over a pulley connected with the handle-bar, and over a segmental attachment secured thereto, said cord being connected with a lever adjacent to one of the handles, and the shaft on which said roller is mounted, being provided with a sounder which is adapted to operate the hammer-lever which operates in connection with the gong to give the alarm, substantially as shown and described.

In testimony that I claim the foregoing as my invention I have signed my name, in presence of the subscribing witnesses, this 4th day of January, 1896.

CLAUDE VERNON ZINN.

Witnesses:
A. GARDINER,
W. B. IVES.